(12) United States Patent
Meyer-Delius Di Vasto

(10) Patent No.: US 12,070,866 B2
(45) Date of Patent: Aug. 27, 2024

(54) ARTICULATED-ARM ROBOT

(71) Applicant: Siemens Aktiengesellschaft, Munich (DE)

(72) Inventor: Daniel Meyer-Delius Di Vasto, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 405 days.

(21) Appl. No.: 17/299,202

(22) PCT Filed: Nov. 14, 2019

(86) PCT No.: PCT/EP2019/081333
§ 371 (c)(1),
(2) Date: Jun. 2, 2021

(87) PCT Pub. No.: WO2020/114748
PCT Pub. Date: Jun. 11, 2020

(65) Prior Publication Data
US 2022/0048192 A1 Feb. 17, 2022

(30) Foreign Application Priority Data
Dec. 5, 2018 (EP) .................... 18210455

(51) Int. Cl.
*B25J 9/16* (2006.01)
*B25J 13/08* (2006.01)
(Continued)

(52) U.S. Cl.
CPC ........... *B25J 9/1674* (2013.01); *B25J 9/1633* (2013.01); *B25J 13/085* (2013.01); *B25J 19/04* (2013.01);
(Continued)

(58) Field of Classification Search
CPC ........ B25J 9/1633; B25J 13/085; B25J 19/04; B25J 19/00; B25J 9/1674; G05B 19/423;
(Continued)

(56) References Cited

U.S. PATENT DOCUMENTS 9,375,841 B1 * 6/2016 Kemper ................. B25J 13/085
2009/0132085 A1 5/2009 Sjostrand et al.
(Continued)

FOREIGN PATENT DOCUMENTS

CH 701886 A2 3/2011
CN 101259615 A 9/2008
(Continued)

OTHER PUBLICATIONS

PCT International Search Report and Written Opinion of International Searching Authority mailed Mar. 2, 2020 corresponding to PCT International Application No. PCT/EP2019/08133 filed Nov. 14, 2019.

*Primary Examiner* — Adam R Mott
*Assistant Examiner* — Sagar Kc
(74) *Attorney, Agent, or Firm* — Schmeiser, Olsen & Watts LLP

(57) ABSTRACT

The articulated-arm robot has a robot arm with an arm element movable via a joint and a sensor for continuously measuring a status parameter of the joint. The articulated-arm robot also has an optical signaling device arranged on the robot arm in spatial assignment to the joint and an assessment device for continuously assessing the measured status parameter in a joint-specific manner and for controlling the signaling device on the basis of the assessment result.

15 Claims, 2 Drawing Sheets

(51) Int. Cl.
  *B25J 19/04* (2006.01)
  *G05B 19/423* (2006.01)
(52) U.S. Cl.
  CPC .. *G05B 19/423* (2013.01); *G05B 2219/36433* (2013.01)
(58) Field of Classification Search
  CPC ........... G05B 2219/36433; G05B 2219/39325; G09F 27/00
  See application file for complete search history.

(56) References Cited

U.S. PATENT DOCUMENTS

| | | | |
|---|---|---|---|
| 2014/0052298 A1* | 2/2014 | Hourtash | A61B 34/35 700/263 |
| 2015/0127151 A1 | 5/2015 | Riedel et al. | |
| 2015/0217445 A1* | 8/2015 | Hietmann | B25J 9/1656 901/4 |
| 2016/0263752 A1* | 9/2016 | Edsinger | B25J 13/08 |
| 2017/0361464 A1 | 12/2017 | Sasaki | |
| 2018/0169859 A1* | 6/2018 | Sugiyama | B25J 13/06 |
| 2018/0235724 A1* | 8/2018 | Nowatschin | B25J 13/02 |
| 2018/0236660 A1 | 8/2018 | Ferrer et al. | |
| 2019/0054629 A1 | 2/2019 | Riedel | |
| 2019/0086907 A1 | 3/2019 | Oestergaard et al. | |
| 2019/0115982 A1* | 4/2019 | Okamoto | B25J 9/1602 |
| 2019/0299402 A1* | 10/2019 | Chang | G05B 19/423 |
| 2020/0122325 A1* | 4/2020 | Iwasa | B25J 9/0081 |
| 2021/0001484 A1* | 1/2021 | Bogart | B25J 13/088 |

FOREIGN PATENT DOCUMENTS

| | | |
|---|---|---|
| CN | 104608127 A | 5/2015 |
| CN | 104827473 A | 8/2015 |
| CN | 108453729 A | 8/2018 |
| CN | 108700868 A | 10/2018 |
| CN | 108883534 A | 11/2018 |
| DE | 102015210218 A1 | 12/2016 |
| JP | H06314111 A | 11/1994 |
| JP | 2001050741 A | 2/2001 |
| JP | 2012218139 A | 11/2012 |
| WO | 2015183419 A | 12/2015 |
| WO | 2016193217 A1 | 12/2016 |

* cited by examiner

ARTICULATED-ARM ROBOT

CROSS-REFERENCE TO RELATED APPLICATIONS

This application claims priority to PCT Application No. PCT/EP2019/081333, having a filing date of Nov. 14, 2019, which is based off of EP Application No. 18210455.4, having a filing date of Dec. 5, 2018, the entire contents both of which are hereby incorporated by reference.

FIELD OF TECHNOLOGY

The following relates to an articulated-arm robot.

BACKGROUND

Many robot systems, such as for example production robots, medical robots, service robots or industrial robots, are equipped with one or more robot arms. In modern variants of such articulated-arm robots, sequences of movements of a respective robot arm can be taught or programmed by an operator manually guiding the robot arm. This involves the operator manually moving one or more arm members of the robot arm while the deflections, orientations and/or positions of the joints and/or of the arm members passed through are continuously logged. On the basis of the movement data thus stored, the articulated-arm robot can repeat the taught sequence of movements whenever desired. Such programming of sequences of movements of robots is often also referred to as "teaching" or more specifically as "hand-guiding".

However, such teaching, or also other manual interactions between the robot and the operator, often requires specific knowledge of the kinematic and dynamic properties and restrictions of the robot. For instance, in the case of the movement of the robot arm, generally various secondary conditions must be taken into account, such as for example maximum angles of rotation or deflections of the joints or of the arm members and their loading limits. The requirement for taking such secondary conditions into account can have a considerable effect on the efficiency of the interaction with the robot.

SUMMARY

An aspect relates to provide an articulated-arm robot that allows more efficient interaction between the robot and the operator.

The articulated-arm robot according to embodiments of the invention has a robot arm with an arm member that is movable by way of a joint and a sensor for continuously measuring a status parameter of the joint. The articulated-arm robot also has an optical signaling device arranged on the robot arm in spatial assignment to the joint and an assessment device for continuously assessing the measured status parameter in a joint-specific manner and for controlling the signaling device on the basis of a result of the assessment.

The signaling device arranged on the robot arm allows a kinematic or dynamic state of the joint or of the arm member to be visualized in an easy way. In particular, an operator can optically perceive a current kinematic or dynamic state of the joint or of the arm member without averting his view from the robot arm that is specifically being guided or is moving. In many cases, this allows more accurate, quicker, safer and consequently more efficient interaction between the articulated-arm robot and the operator.

According to an advantageous embodiment of the invention, the status parameter may concerna deflection, an angle of rotation, a rotating speed or some other kinematic movement parameter of the joint, a force, a loading, a torque or some other dynamic force parameter of the joint and/or a temperature, an oil pressure, an oil quantity or some other operating parameter of the joint. The status parameter may be in particular a one-dimensional or multi-dimensional parameter, by which one or more physical parameters of the joint are quantified. For measuring a force exerted by the joint or acting on it, in particular a motor current, an oil pressure or some other hydraulic pressure of the joint may be measured by the sensor. Generally, a state of the arm member can also be deduced by means of the status parameter.

According to a further advantageous embodiment of the invention, the assessment device may be set up to quantify a deviation between the measured status parameter and a reference parameter. The signaling device may be correspondingly set up to emit gradually graduated optical signals on the basis of the quantified deviation. The reference parameter may be in particular a one-dimensional or multi-dimensional parameter, by which one or more joint-specific limit values, secondary conditions or boundary conditions of the joint are quantified, for example as threshold values. In particular, the reference parameter may indicate a kinematic secondary condition, such as for example a restriction of the movement or deflection of the joint, in the form of a maximum deflection or a maximum angle of rotation. Furthermore, the reference parameter may quantify a dynamic secondary condition, such as for example a maximum torque acting on the joint or exerted by it. In view of the fact that such limit values often cannot be observed directly by the operator, a visualization of the quantified deviation by the signaling device is generally very helpful.

Furthermore, the articulated-arm robot may have a teaching device for teaching a sequence of movements of the robot arm by manually guiding the robot arm and evaluating the measured status parameter. The assessment device may be correspondingly set up to control the signaling device during the teaching on the basis of the measured status parameter. A visualization of the status parameter during the teaching allows kinematic or dynamic states of the joint, which often cannot be observed directly by the operator, to be taken into consideration in an interactive way and without averting the view from the robot arm.

The signaling device may be attached to the arm member at a distance from the joint that is smaller than a distance from other joints of the robot arm. In particular, the signaling device may be arranged directly next to the assigned joint on a rigid part of the arm member. In this way, the spatial assignment of the signaling device to the joint can be intuitively discerned.

According to a further advantageous embodiment of the invention, the signaling device may comprise one or more light-emitting diodes and/or one or more displays.

In particular, the signaling device may comprise one or more touch-sensitive displays. Such touch-sensitive displays allow an operator to enter joint-specific inputs on the robot arm itself during the teaching or during other interactions with the articulated-arm robot.

Advantageously, the signaling device may comprise lighting means or lighting, which are attached around the arm member and/or around the joint in the form of a ring or in the form of part of a ring. This may be for example a ring of light-emitting diodes, a ring of displays of pocket calculators or smartwatches or a display bent into a ring. Such ring-shaped lighting means or lighting are generally clearly visible from all sides.

Furthermore, the signaling device may be set up to vary a signal intensity and/or signal color on the basis of the result of the assessment.

In particular, the signaling device may comprise a number of optical signal transmitters, which can in each case be activated individually and on the basis of the result of the assessment. This may be for example a number of rings of differently colored lighting means or differently colored lighting.

According to an advantageous embodiment of the invention, the signaling device may also comprise a direction indicator. The assessment device may be correspondingly set up to determine on the basis of the measured status parameter a movement-optimizing and/or force-optimizing preferential direction for a movement of the joint and to control the direction indicator on the basis of the determined preferential direction.

BRIEF DESCRIPTION

Some of the embodiments will be described in detail, with reference to the following figures, wherein like designations denote like members, wherein.

DETAILED DESCRIPTION

Figure 1:
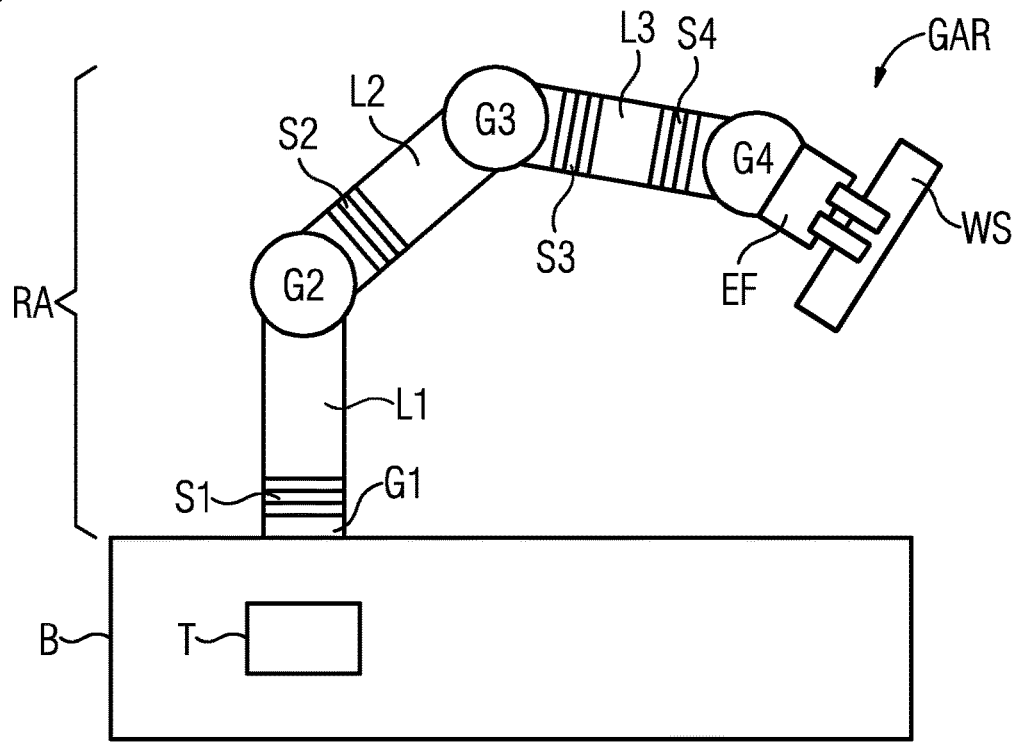
FIG. 1 shows an articulated-arm robot according to embodiments of the invention.

In FIG. 1, an articulated-arm robot GAR according to embodiments of the invention, for example a production robot, medical robot, service robot, industrial robot or some other robot interacting with users or operators, is schematically represented. The articulated-arm robot GAR has a robot arm RA, which is mounted on a robot base B.

The robot arm RA is connected to the robot base B by way of a joint G1 of the robot arm RA. The joint G1, the axis of rotation of which is vertical in the present exemplary embodiment, connects an arm member L1 of the robot arm RA to the robot base B. The arm member L1 is also connected by way of a joint G2 to an arm member L2, the latter is connected by way of a joint G3 to an arm member L3 and the latter is connected by way of a joint G4 to an end effector EF. These joints G1, . . . , G4 and the arm members L1, . . . , L3 as well as the end effector EF are parts of the robot arm RA. In FIG. 1, by way of example, the end effector EF is gripping a workpiece WS to be handled by the articulated-arm robot GAR. Such joints of a robot arm are often also referred to as axes or joints, the arm members as links.

The articulated-arm robot GAR also has a teaching device T for teaching a sequence of movements of the robot arm RA by manual guiding, i.e. an operator moving the robot arm RA. The robot arm RA may in particular be guided by manually moving the end effector EF.

While the robot arm RA is being guided by the operator, the movements of the joints G1, . . . , G4 and/or of the arm members L1, . . . , L3 caused by this are measured and stored in the form of movement data. On the basis of the movement data thus stored, the articulated-arm robot GAR can by means of the teaching device T repeat every taught sequence of movements whenever desired.

Furthermore, joint-specific optical signaling devices S1, . . . , S4 are respectively attached to the robot arm RA respectively in spatial assignment to a joint G1, G2, G3 or G4. By the spatial assignment, a respective signaling device S1, . . . or S4 is assigned joint-specifically to a respective joint G1, . . . or G4. In the present exemplary embodiment, the signaling device S1 is assigned to the joint G1, the signaling device S2 is assigned to the joint G2, the signaling device S3 is assigned to the joint G3 and the signaling device S4 is assigned to the joint G4.

The signaling devices S1, . . . , S4 are respectively arranged close to the respectively assigned joint G1, . . . or G4 in the form of a ring around an arm member L1, L2 or L3 connected to the corresponding joint. The arrangement is such that an association of a signaling device with the corresponding joint can be directly and clearly perceived by the operator. As an alternative or in addition, a joint-specific signaling device may be attached to the assigned joint itself.

In the present exemplary embodiment, the signaling devices S1, S2, S3 and S4 respectively comprise a number of individually controllable rings with lighting means or lighting, for example rings with light-emitting diodes or displays bent in the form of a ring. In FIG. 1, three rings attached around a respective arm member are indicated for each signaling device S1, S2, S3 or S4.

Figure 2:
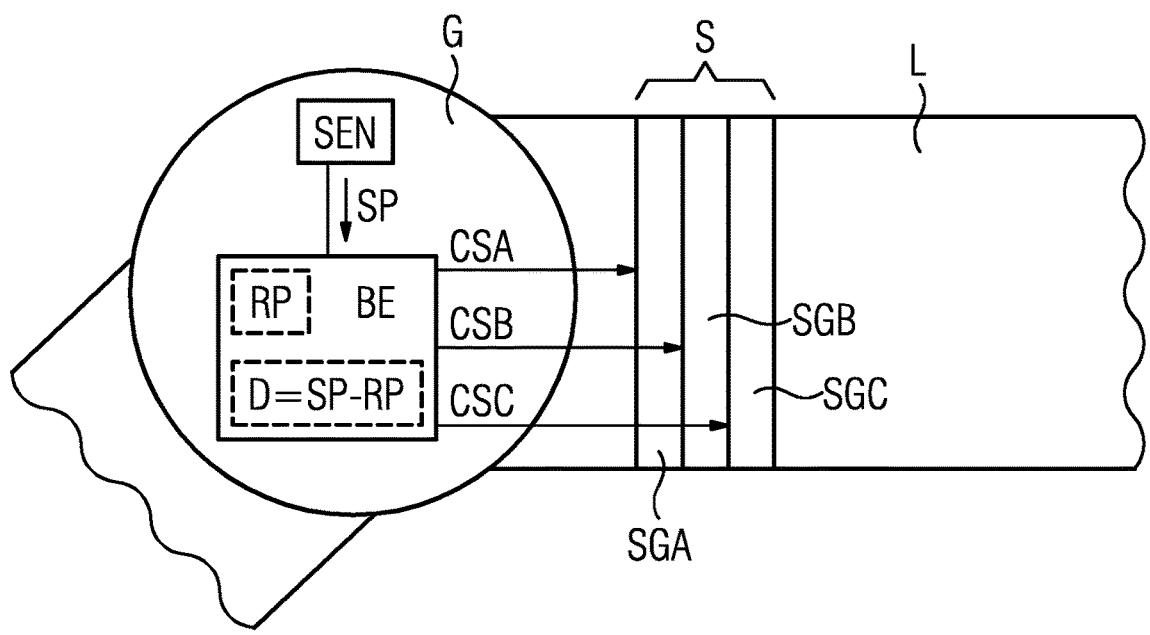
FIG. 2 shows part of a robot arm of the articulated-arm robot.

FIG. 2 illustrates part of the robot arm RA in a more detailed representation.

Of the joints G1, . . . , G4 represented in FIG. 1, in FIG. 2 a joint G and an arm member L connected thereto of the arm members L1, . . . , L3 are represented by way of example. Another of the arm members is indicated on the left side of the joint G. Furthermore, a signaling device S of the signaling devices S1, . . . , S4 is attached in the form of a ring around the arm member L close to the joint. The signaling device S comprises in the present exemplary embodiment various optical signal transmitters SGA, SGB and SGC.

Arranged in or on the joint G is/are one or more joint-specific sensors SEN. In the present exemplary embodiment, the sensors SEN measure continuously and in real time an angle of rotation of the joint G as kinematic movement parameters and a torque acting on the joint G or exerted by it as dynamic force parameters of the joint G. Such a force parameter can be determined in an easy way by measuring a motor current or a hydraulic pressure of the joint G.

The angle of rotation and the torque are detected as quantified, joint-specific and multi-component status parameters SP of the joint G and transmitted by the sensors SEN to an assessment device BE. As an alternative or in addition, the status parameter SP may also quantify other physical parameters or operating parameters of the joint G.

The assessment device BE is coupled to the sensors SEN and to the signaling device S and is arranged within the joint G. As an alternative or in addition, the assessment device BE may also be implemented fully or partially externally of the joint, in particular in the articulated-arm robot GAR, or fully or partially externally of the articulated-arm robot GAR.

In the following exemplary embodiment, the assessment device BE is arranged in the joint G and is operated joint-specifically and independently of corresponding assessment devices for other joints. Consequently, in many cases it is possible to dispense with additional coordination or communication with other control elements.

The assessment device BE serves for the continuous, joint-specific assessment of the measured status parameter SP of the joint G with regard to one or more specified target criteria. In the present exemplary embodiment, the target criteria are defined by a joint-specific, multi-component reference parameter RP, which is stored in the assessment device BE. The reference parameter RP comprises a limit value for the angle of rotation of the joint G as a kinematic secondary condition and a limit value for an acting or exerted torque of the joint G as a dynamic secondary condition. For performing the assessment, the assessment device BE may have one or more processors and one or more memories coupled to the processor.

For the assessment of the status parameter SP, the assessment device BE compares the components of the status parameter SP with the components of the reference parameter RP and quantifies a deviation D between the status parameter SP and the reference parameter RP as a joint-specific assessment result. The deviation D may be determined as the difference SP-RP of the status parameter SP and the reference parameter RP or as the absolute amount or square of this difference. The deviation D may be quantified as a multi-component variable, or deviations may be combined by components to form a scalar deviation D. In the present exemplary embodiment, a multi-component deviation D is determined, comprising a deviation between the movement parameter of the status parameter SP and the associated limit value of the reference parameter RP and a deviation between the force parameter of the status parameter SP and the associated limit value of the reference parameter RP.

Depending on the values of the components of the deviation D, graduated, signal-transmitter-specific control signals CSA, CSB, CSC are formed by the assessment device BE and used to control the signaling device S in a quantified way. In this case, the signal transmitter SGA, the signal transmitter SGB and the signal transmitter SGC are controlled in each case individually and signal-transmitter-specifically by the control signal CSA, the control signal CSB and the control signal CSC, respectively.

In the present exemplary embodiment, the signal transmitters SGA, SGB and SGC are respectively arranged in the form of a ring around the arm member L in the vicinity of the joint and respectively comprise differently colored lighting means or differently colored lighting, such as for example light-emitting diodes, or a display bent in the form of a ring. Such a ring-shaped arrangement is advantageous to the extent that for the operator it is visible from all sides without averting the view from the articulated-arm robot GAR. The ring-shaped signal transmitters SGA, SGB and SGC respectively emit graduated optical signals, the color and/or luminous intensity of which is gradually variable on the basis of the control signals CSA, CSB and CSC or on the basis of the deviation D.

In particular, the number and color of the lighting-up signal transmitters SGA, SGB and SGC may be varied on the basis of the components of the measured status parameter SP. Here, the number of luminous rings SGA, SGB and SGC may, for example, code a distance of the current angle of rotation of the joint G from the limiting angle of the reference parameter RP and a color of the luminous rings SGA, SGB and SGC may indicate a distance of the current torque from the limiting torque of the reference parameter RP. For example according to the following assignment:

Only the signal transmitter SGA lights up: the angle of rotation of the joint G is at a negligible distance from the limiting angle of the reference parameter RP.

Only SGA and SGB light up: the angle of rotation of the joint G is in the vicinity of the limiting angle.

SGA, SGB and SGC light up: the limiting angle has been reached.

Lighting up green: the current torque of the joint G is at a negligible distance from the limiting torque of the reference parameter RP.

Lighting up yellow: the current torque of the joint G is in the vicinity of the limiting torque.

Lighting up red: the limiting torque has been reached or exceeded.

In the way described above, a kinematic state and a dynamic state of the joint G or of the arm member L can be simultaneously visualized joint-specifically on the robot arm RA. The visualization can be perceived interactively and directly, without averting the view from the robot arm RA that is specifically being guided or is moving. This allows more accurate, quicker, safer and consequently more efficient interaction between the articulated-arm robot GAR and the operator.

Figure 3:
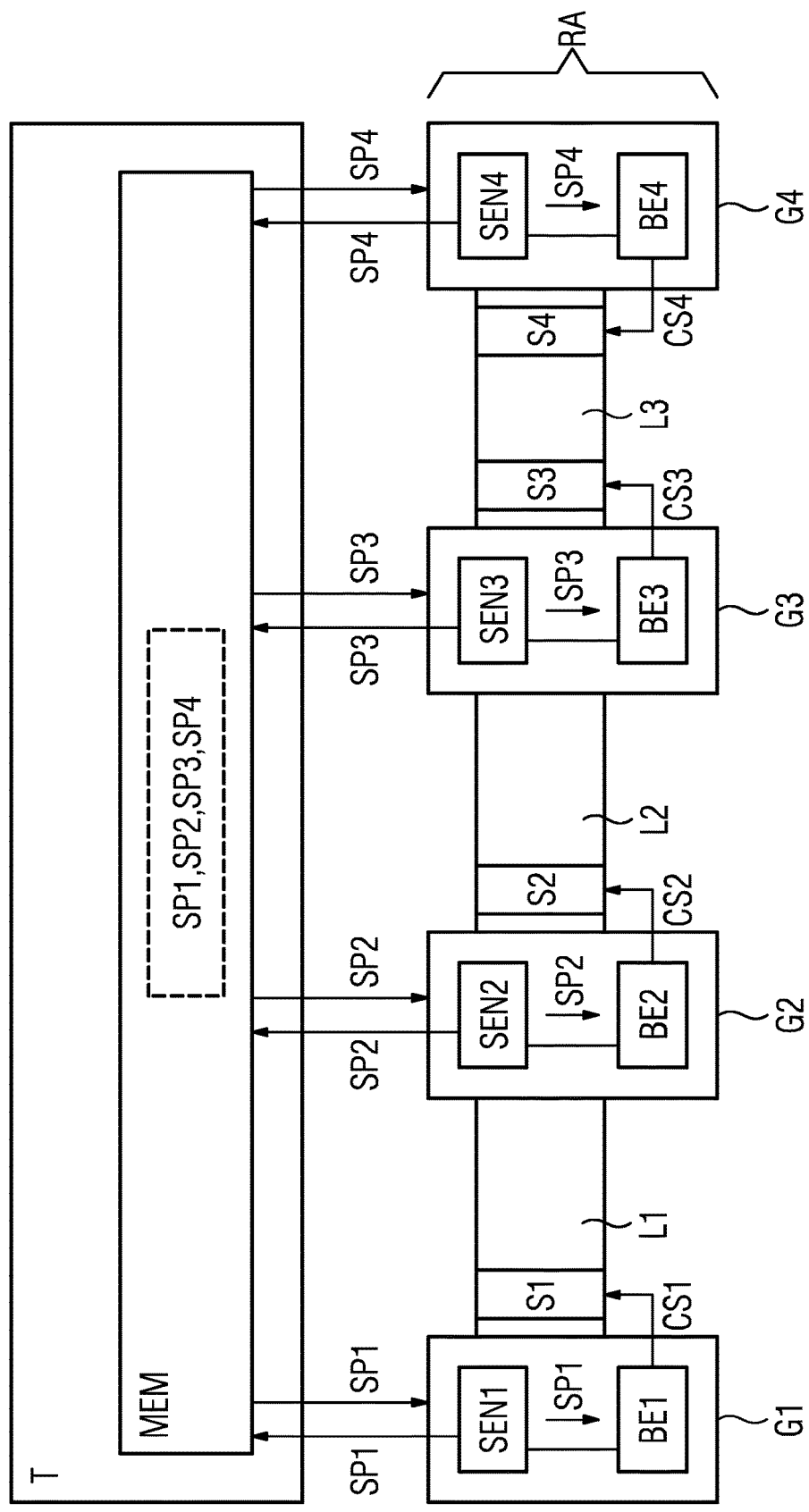
FIG. 3 shows a functional diagram for illustrating the teaching of a sequence of movements of the articulated-arm robot.

FIG. 3 shows a functional diagram to illustrate the teaching of a sequence of movements of the articulated-arm robot GAR. To the extent that the same reference signs as in the previous figures are used in FIG. 3, these reference signs denote the same entities as may be described, implemented or realized above. In particular, a part of the robot arm RA with the joints G1, . . . , G4 and the arm members L1, . . . , L3 that is represented in FIG. 1 is schematically represented in FIG. 3.

The joints G1, . . . , G4 respectively comprise joint-specific sensors SEN1, . . . or SEN4, by which, as described above, in each case a multi-component, joint-specific status parameter SP1, . . . or SP4 of the respective joint G1, . . . or G4 is continuously measured.

For teaching a sequence of movements of the robot arm RA—as already mentioned above—an operator manually guides the robot arm RA along a desired movement trajectory, while the status parameters SP1, . . . , SP4 that are thereby continuously measured and transmitted to the teaching device T are stored in a memory MEN of the teaching device T. On the basis of the status parameters SP1, . . . , SP4 stored in this way, the articulated-arm robot GAR can repeat every taught sequence of movements whenever desired. For this purpose, the stored status parameters SP1, . . . , SP4, in particular the kinematic movement parameters, are transmitted from the teaching device T to the respective joint G1, . . . or G4 in a time sequence corresponding to the teaching process. On the basis of the transmitted status parameters SP1, . . . , SP4, servo motors (not represented) of a respective joint are controlled in such a way that the stored sequence of movements is reproduced.

During the teaching, the measured status parameters SP1, . . . , SP4 are additionally transmitted from the respective sensors SEN1, . . . or SEN4 to a respective assessment device BE1, . . . or BE4 of the corresponding joint G1, . . . or G4. The respective assessment device BE1, . . . or BE4 is set up to control an optical signaling device S1, . . . or S4 assigned to the respective joint G1, . . . or G4 during the teaching on the basis of the respectively measured status parameter SP1, . . . or SP4.

The signaling devices S1, . . . , S4 may be respectively implemented as described in connection with FIG. 2. For reasons of overall clarity, individual signal transmitters of the signaling devices S1, . . . , S4 are not distinguished in FIG. 3.

For controlling a respective signaling device S1, . . . or S4, a respective assessment device BE1, . . . or BE4 forms a joint-specific control signal CS1, . . . or CS4 and transmits it to the corresponding signaling device S1, . . . or S4. As described in connection with FIG. 2, the signaling devices S1, . . . , S4 are controlled by the control signals CS1, . . . , CS4 during the teaching process.

In this way, current kinematic and dynamic states of the joints G1, . . . , G4 can be optically visualized continuously and in real time during the teaching process. In particular, secondary conditions or limit values that cannot be directly observed by the operator can thus be indicated directly to the operator. In this way, unfavorable poses, overload situations or instances of damage can often be avoided already during the performance of a movement. This allows the teaching process or some other interaction of the operator with the articulated-arm robot GAR to be made altogether more efficient.

For further optimizing the teaching process or some other interaction of the operator with the articulated-arm robot GAR, a respective signaling device S1, . . . or S4 may comprise a direction indicator (not represented). By the direction indicator, an advantageous direction of movement and/or a direction of an acting force can be indicated on the basis of a respective status parameter SP1, . . . or SP4. In particular, a preferential direction for a movement that leads to a lower expenditure of force or to a lower loading of the robot arm RA can be indicated to the teaching operator. Such a preferential direction may be determined for example by simulation of possible movements and movement-related force conditions of the robot arm RA and by applying known optimizing methods.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An articulated-arm robot, comprising:
a robot arm with an arm member that is movable by way of a joint;
a sensor for continuously measuring a status parameter of the joint;
an optical signaling device attached to the robot arm, wherein the optical signaling device is separated from the joint by a distance from the joint, and wherein the optical signaling device is assigned to the joint;
an assessment device for continuously assessing the measured status parameter in a joint-specific manner and for controlling the optical signaling device on the basis of a result of the assessment, said assessment device being disposed in the joint or on the robot arm; and
a teaching device for teaching a sequence of movements of the robot arm by manually guiding the robot arm and evaluating the measured status parameter,
wherein the assessment device is set up to control the optical signaling device during the teaching on the basis of the measured status parameter.

2. The articulated-arm robot as claimed in claim 1, wherein the measured status parameter is selected from the group consisting of a deflection, an angle of rotation, a force, a loading, a torque, an oil pressure, and an oil quantity.

3. The articulated-arm robot as claimed in claim 2, wherein the assessment device is set up to quantify a deviation between the measured status parameter and a reference parameter or a square of the deviation, and in that the optical signaling device is set up to emit gradually graduated optical signals on the basis of the quantified deviation.

4. The articulated-arm robot as claimed in claim 3, wherein the assessment device is set up to quantify the square of the deviation.

5. The articulated-arm robot as claimed in claim 1, wherein the optical signaling device is attached to the arm member at the distance from the joint that is smaller than a distance from other joints of the robot arm.

6. The articulated-arm robot as claimed in claim 1, wherein the optical signaling device comprises one or more light-emitting diodes and/or one or more displays.

7. The articulated-arm robot as claimed in claim 1, wherein the optical signaling device comprises one or more touch-sensitive displays.

8. The articulated-arm robot as claimed in claim 1, wherein the optical signaling device comprises lighting, which are attached around the arm member in a form of a ring or in a form of part of a ring.

9. The articulated-arm robot as claimed in claim 1, wherein the optical signaling device is set up to vary a signal intensity and/or signal color on the basis of the result of the assessment.

10. The articulated-arm robot as claimed in claim 1, wherein the optical signaling device comprises a number of optical signal transmitters, which can in each case be activated individually and on the basis of the result of the assessment.

11. The articulated-arm robot as claimed in claim 1, wherein the optical signaling device comprises a direction indicator, and in that the assessment device is set up to determine on the basis of the measured status parameter a movement-optimizing and/or force-optimizing preferential direction for a movement of the joint and to control the direction indicator on the basis of the determined preferential direction.

12. The articulated-arm robot as claimed in claim 1, wherein the teaching device is disposed in a robot base to which the robot arm is connected via the joint.

13. The articulated-arm robot as claimed in claim 1, wherein the robot arm has the teaching device.

14. The articulated-arm robot as claimed in claim 1, wherein the assessment device is disposed in the joint.

15. The articulated-arm robot as claimed in claim 1, wherein the assessment device is disposed on the robot arm fully external to the joint.

* * * * *